No. 673,304. Patented Apr. 30, 1901.
B. D. & F. M. THARP.
ROTARY WEED CUTTER AND CULTIVATOR.
(Application filed Oct. 22, 1900.)

(No Model.)

WITNESSES:
Jos. A. Ryan
Amos W. Hart

INVENTORS
Beverly D. Tharp.
Frank M. Tharp.
BY Munn & Co.
ATTORNEYS

UNITED STATES PATENT OFFICE.

BEVERLY D. THARP AND FRANK M. THARP, OF ATHENA, OREGON.

ROTARY WEED-CUTTER AND CULTIVATOR.

SPECIFICATION forming part of Letters Patent No. 673,304, dated April 30, 1901.

Application filed October 22, 1900. Serial No. 33,987. (No model.)

*To all whom it may concern:*

Be it known that we, BEVERLY D. THARP and FRANK M. THARP, residing at Athena, in the county of Umatilla and State of Oregon, have made certain new and useful Improvements in Rotary Weed-Cutters and Cultivators, of which the following is a specification.

This invention is an improvement in a class of machines having a series of rotary cutting-disks which are so arranged as to work parallel, or nearly so, to the surface of the ground.

The invention is embodied in the construction and combination of parts hereinafter described and claimed.

The framework of the machine is mounted adjustably upon three transporting-wheels F G H and provided with a hinged pole or tongue. The wheel F is at the rear and wheels G H near the front. The wheels G H are applied to crank-axles $a$, arranged in alinement transversely at the front of the frame K, and said axles are provided with lever-arms, to which hand-levers $g$ and $h$ are connected by a rod $i$ in the manner shown, whereby the shifting of said levers rotates the axles, and thereby raises or lowers the frame K. The rear wheel F is journaled in a bifurcated arm $f'$, which is attached to a crank-axle $a'$, having an adjusting hand-lever $f$, arranged contiguous to the driver's seat. The front levers $g$ $h$ are reached without difficulty, being located in front of said seat. The three levers may be locked in any adjustment by pawls and racks of a well-known construction and the frame K thereby held any required distance from the surface of the ground.

Figure 1:
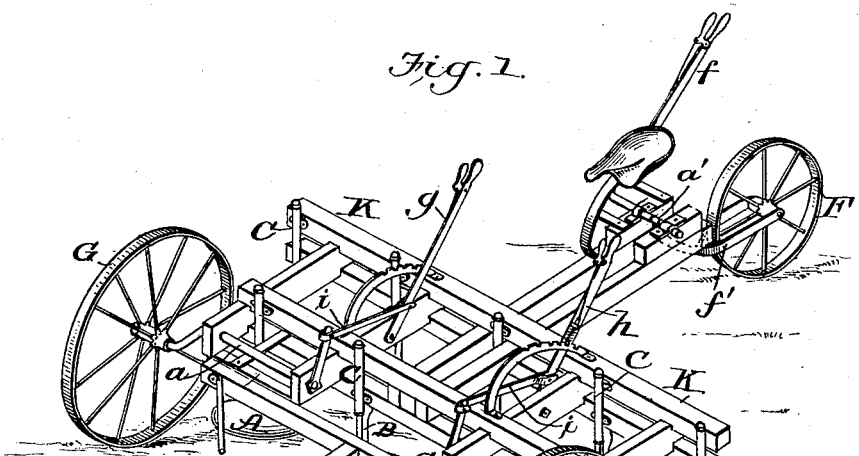
Figure 2:
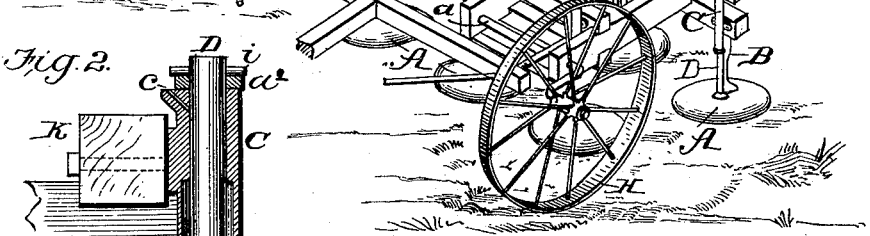

Two transverse parallel rows of horizontal cutting-disks A are supported on the frame K by means of vertical shafts D, which are held rotatably in sleeve-boxes C, secured to frame K. Said boxes are provided with apertured lugs, and screw-bolts through the same, as shown in Figs. 1 and 2, and hold the boxes rigidly vertical. Each shaft D has a shoulder, and a washer $b$ (see Fig. 2) is interposed between it and the adjacent box C to relieve friction and wear. Another washer $a^2$ is applied to the upper end of each shaft D and secured by a pin $i$. Thus the shafts are held securely, yet adapted for convenient removal, while free to rotate on their axes. An oil-hole $c$ is provided in each box C.

To the lower shouldered end of each shaft D a concavo-convex cutting-disk A is clamped removably between a washer $e$, shrunk thereon, and a screw-nut $n$, arranged in the concavity. Thus the several disks A and their shafts D form each a rotatable device. The several crank-axles being independent, and their adjusting and locking means also independent, and their location being triangular, as shown, it is apparent the frame may be adjusted higher or lower bodily, or at either side or at the rear, and the angle of the disks may thus be adjusted as desired relative to the ground surface to be worked.

Figure 3:
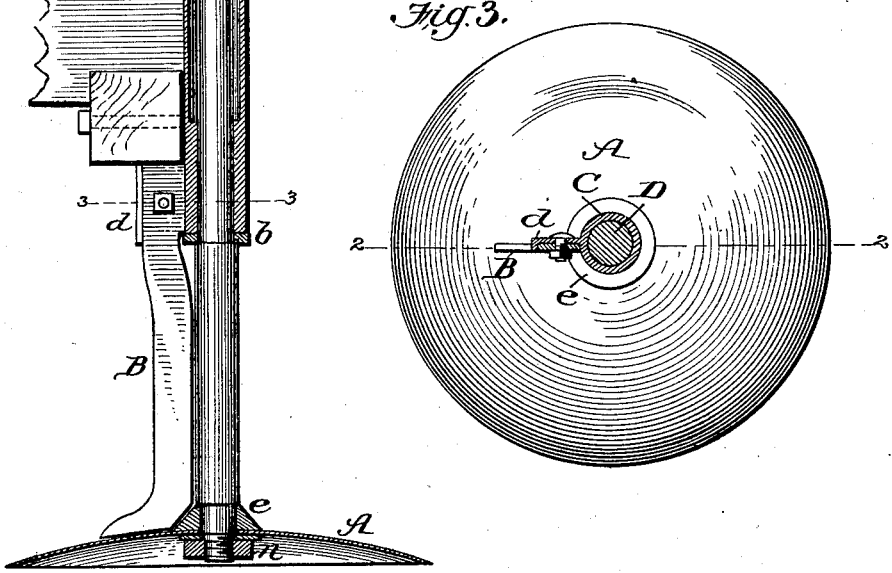

A scraper B is arranged over each cutter A contiguous to its shaft D. Said scraper is a flat bar arranged vertically and having an elongated foot that extends part way over the convexity of the disk. The shank or upper end of each scraper B is secured by a screw-bolt to a rear extension or flange $d$ (see Fig. 3) of a bracket or boxing C, the same having a vertical lip which engages the rear edge of the scraper, as shown. By this means the scrapers are held detachably, but firmly.

In operation the disks or cutters work slightly beneath the surface to be cultivated and turn independently, with ease, to the right or left, according as the pressure is greater on one side or the other of the individual cutters. They are thus prevented from clogging on the edges. Their form and arrangement are also such that the lower side wears away, so as to render them self-sharpening.

The scrapers B, working close to the upper side, remove any dirt and cause the cutters to scour perfectly.

It will be noted that the cutters of one row are opposite the spaces between those of the adjacent row, so that the entire ground is worked and cultivated, as required.

What we claim is—

In a weed-cutter and cultivator, the combination with the rotary disk and vertical shaft carrying the same, of the scraper arranged in rear of the shaft and over the disk as shown, a boxing having a rearwardly-extended portion provided with a bent lip or flange, the shank of said scraper being bolted in place abutting on said flange, as shown and described.

BEVERLY D. THARP.
FRANK M. THARP.

In presence of—
J. W. SMITH,
J. A. SCOTT.